United States Patent Office 3,524,888
Patented Aug. 18, 1970

---

3,524,888
ALKYL BENZENE HYDROPEROXIDE PREPARATION
Hans Dressler, Pitcairn, and Robert J. Lovin, Murrysville, Pa., assignors to Koppers Company, Inc., a corporation of Delaware
No Drawing. Filed Nov. 14, 1967, Ser. No. 682,984
Int. Cl. C07c 73/06, 73/08
U.S. Cl. 260—610
7 Claims

ABSTRACT OF THE DISCLOSURE

Increased rates of alkyl benzene hydroperoxide formation and increased conversion of polyalkyl benzenes to hydroperoxides result from the oxidation of alkylbenzene in the presence of an N,N-dialkylacetamide or sulfolane as solvent. These solvents enable easy separation of the hydroperoxide from the reaction mixtures. The hydroperoxides are useful as polymerization catalysts and as intermediates in the formation of tar acids.

BACKGROUND OF THE INVENTION

Since the discovery of the acid-catalyzed cleavage of cumene hydroperoxide to give phenol and acetone by H. Hock and S. Lang, Ber., 77 257 (1944), intensive academic and industrial interest developed in the hydroperoxidation (also called autoxidation) of alkylbenzenes. The hydroperoxide formation is a complex reaction depending upon such variables as the type of initiator and hydrocarbon, temperature, impurities, and the like. Problems of slow reaction rates and conversions and the formation of numerous byproducts still plague the hydroperoxide processes.

It has now been found that, surprisingly, the use of particular solvents in a hydroperoxide process greatly increases the rate of hydroperoxide formation of alkylbenzenes, and gives conversions of polyalkyl benzenes in amounts heretofore thought unobtainable. The solvents, in addition, enable ready separation of the hydroperoxide from the reaction mixture, providing an efficient and economical process.

SUMMARY OF THE INVENTION

Hydroperoxides of aromatic hydrocarbons of the formula:

wherein R is an alkyl or cycloalkyl group having 1–6 carbon atoms and $x$ is an integer from 1–4 are produced by contacting the hydrocarbon, in liquid phase, with oxygen at an elevated temperature and in the presence of an organic solvent selected from the N,N-dimethylacetamide, N,N-diethylacetamide and sulfolane.

DETAILED DESCRIPTION

Aromatic hydrocarbons which can be oxidized by the present process are those illustrated by the above-described formula and include the alkyl benzenes such as toluene, ethylbenzene, cumene (isopropylbenzene), n-propylbenzene, isobutylbenzene, cyclohexylbenzene, and the like. The polyalkyl benzenes which can be so oxidized are exemplified by such compounds such as ortho-xylene, para-xylene, diethylbenzene, p-cymene (p-isopropyltoluene), 5-isopropyl-m-xylene (3,5-dimethylcumene), 4-isopropyl-o-xylene (3,4-dimethylcumene), pseudocumene (1,2,4-trimethylbenzene, mesitylene (1,3,5-trimethylbenzene), durene (1,2,4,5-tetramethylbenzene) and the like.

The aromatic hydrocarbon is oxidized in the presence of an organic solvent such as N,N-dimethylacetamide, N,N-diethylacetamide or sulfolane (tetrahydrothiophene-1,1-dioxide), and should form a homogeneous solution with the solvent.

The present process is unique in view of the fact that many solvents such as anisole, diphenyl ether, trichlorobenzene, o-dichlorobenzene and dimethyl sulfoxide cause a reduction in the rate of hydroperoxide formation as is evidenced in Example XI hereinafter. In fact, dimethyl sulfoxide severely suppressed the accumulation of hydroperoxide of p-cymene.

The solvent should be present in an amount of between 25 to 150 percent based on the weight of aromatic hydrocarbon. Lesser amounts do not give the four-fold or more increased rates of hydroperoxide formations evidenced in the present process, while the use of more than about 150 percent does not provide any additional benefits and would be uneconomical.

The reaction is carried out in liquid phase meaning that the gaseous oxygen or oxygen containing gas such as air is fed into the reaction media which is in a liquid state at the desired reaction temperature. The liquid phase reaction media, that is the aromatic hydrocarbon and solvent, is a homogeneous mixture. This enables better contact of the reactants and aids in the reaction.

The homogeneous solution of hydroperoxide in the desired solvent also permits ready separation of the hydroperoxide. The addition of water to the homogeneous reaction mixture, following the oxidation, causes a phase separation. By this phase separation, the bulk of the hydroperoxide is carried by the solvent into the water phase. Then, merely by decantation or the like, the phases can be separated and the hydroperoxides concentrated or decomposed to useful products by conventional means.

As in conventional hydoperoxide producing processes, it is advantageous to carry out the reaction in the presence of small amounts of basic metal salts, oxides or hydroxides. The amounts used should be that which is sufficient to neutralize acidic compounds formed during the reaction. The carbonates, hydroxides and acetates of the alkali metals and oxides or hydroxides of alkaline earth metals are preferred. Examples include: magnesium oxide, sodium carbonate, sodium acetate and the like.

The oxygen necessary for the hydroperoxide formation can be in the form of substantially pure oxygen or gases rich in oxygen, such as commercial oxygen and air. The rate of oxygen flow can be varied over a wide range, and such rates are known to those versed in the art.

Temperatures used during the reaction range between 75–150° C. and are generally dependent upon the hydrocarbon being oxidized. Atmospheric pressure is preferable, although superatmospheric pressures may be used.

The process can be operated as a batch process or can be carried out as a continuous operation depending upon the desirability of either method. The procedure used for determining the amount of hydroperoxide in the reaction in the following examples, was based on the proposed method published by the ASTM (E-298T). This procedure is generally as follows: A 250 ml. iodine flask was purged with nitrogen and weighed on an analytical balance. Approximately, 1 ml. of sample was added and weighed accurately. Glacial acetic acid (25 ml.) and 5 ml. of potassium iodine solution was added. The stoppered flask was left to stand in the dark for 15 minutes. The mixture was then diluted with 50 ml. of water and the liberated iodine titrated with 0.1 N sodium thiosulfate solution until the yellow iodine color disappeared. Near the end point starch (5 ml. 0.1%) may be added and titration continued to disappearance of blue color.

EXAMPLE I

A 250 ml. resin kettle was equipped with a mechanical stirrer, thermometer, reflux condenser with a gas outlet to a wet test meter, and an air inlet tube coming in from a rotameter. Air was passed through a Drierite column before entering the flowmeter and reactor. The kettle was charged with 50 g. of 4-isopropyl-o-xylene and 50 g. of sulfolane, 2.0 g. of magnesium oxide and 0.5 ml. of cumene hydroperoxide as initiator. Aeration of the charge was commenced at a rate of 0.35 cu. ft. per hour and the mixture heated to 125° C. during 1 hour and held at 125° C. throughout the reaction. The maximum rate of hydroperoxide formation was 15.0 wt. percent per hour. (solvent free basis) with an average hydroperoxide formation of 8.0 wt. percent per hour. The total weight percent of hydroperoxide formation was 25.8.

EXAMPLE II

The process of Example I was repeated except that 100 ml. of 4-isopropyl-o-xylene was used and no sulfolane was added as solvent. Cumene hydroperoxide (1.0 ml.) was used as initiator and magnesium oxide (3 g.) as base. The reaction, over a 7-hour period, gave a maximum of 3.8 wt. percent per hour of hydroperoxide formation; an average of only 2.8 wt. percent per hour; and a final wt. percent of 20.0. Thus, the use of sulfolane as solvent (Example I) increased the maximum rate of hydroperoxide formation four-fold, and the average rate almost three-fold.

EXAMPLE III

Examples I and II were repeated using 2 g. of Na$_2$CO$_3$ in place of the magnesium oxide and ozone as initiator in place of cumene hydroperoxide. At a temperature of 90–120° C. the rate of hydroperoxide formation were:

| Experiment | Sulfolane, g. | Maximum wt. percent per hour | Average wt. percent per hour | Final wt. percent |
|---|---|---|---|---|
| A | 50 | 8.8 | 2.2 | 31.4 |
| B | None | 1.5 | 1.1 | 11.7 |

EXAMPLE IV

A mixture of cumene (50 g.), sulfolane (50 g.), magnesium oxide (3.0 g.) and cumene hydroperoxide (0.5 ml.) was stirred with aeration at 125° C. After 6 hours, 53.6 weight percent of hydroperoxide (calculated on hydrocarbon charged) had accumulated. The maximum rate of hydroperoxide formation was 15.2 percent per hour.

EXAMPLE V

Cumene was subjected to oxidation according to the procedure of Example IV, except that there was no solvent (sulfolane) added to the mixture. After 6 hours, at 125° C. only 25 weight percent of hydroperoxide had accumulated, and a maximum rate of only 5 percent per hour of hydroperoxide formation was achieved. This again illustrates the surprising and greatly increased hydroperoxide formation rates achieved when using sulfolane as a solvent during the oxidation.

EXAMPLE VI

A series of experiments was run generally according to the procedure of Example I for the hydroperoxidation of 1,2,4-trimethylbenzene, using sulfolane, N,N-dimethylacetamide or no solvent. Magnesium oxide was used as the base and cumene hydroperoxide as initiator. Reaction time was 7–8 hours. The results are listed in Table I.

TABLE I

| Experiment | Solvent Type | Wt. percent | Temp., °C. | Hydroperoxide formation Wt. percent/hr. Max. | Avg. | Wt. percent |
|---|---|---|---|---|---|---|
| A | Sulfolane | 50 | 145 | 5.0 | 2.0 | 13.8 |
| B | do | 80 | 125 | 3.0 | 1.5 | 9.5 |
| C | do | 50 | 135 | 2.6 | 1.2 | 8.6 |
| D | Dimethylacetamide | 50 | 125 | 4.0 | 2.1 | 10.4 |
| E | None | | 125 | 1.0 | 0.7 | 5.4 |
| F | do | | 125 | 1.4 | 0.7 | 6.0 |

The use of diethylacetamide in the above hydroperoxidation also gives excellent rates of hydroperoxide formation.

EXAMPLE VII

An oxidation was carried out generally according to Example I using 1,2,4-trimethylbenzene as the hydrocarbon and sulfolane as the solvent. The 1,2,4-trimethylbenzene-sulfolane autoxidation product (80 g.) was placed in a separating funnel and shaken with 2.0 ml. of water. The phases were separated and analyzed. The hydrocarbon (upper) phase contained only about 20% of the hydroperoxide with about 80% of the hydroperoxide being taken into the sulfolane phase (lower phase).

EXAMPLE VIII

To the reactor was charged 50 g. of 1,2,4-trimethylbenzene, 50 g. sulfolane, 2.0 g. of magnesium oxide, 0.5 ml. of cumene hydroperoxide and 0.005 g. cupric acetylacetonate as catalyst. Air was introduced at 0.35 cu. ft. per hour and the stirred mixture was heated to 117° C. in one hour. The reaction was carried out during 4.3 hours at 117° C. and the maximum hydroperoxide formation was 5.4 wt. percent per hour; the average, 3.6 wt. percent per hour, with the final wt. percent being 15.6.

EXAMPLE IX

The oxidation of mesitylene (1,3,5-trimethylbenzene) was also improved by the use of the process of the present invention. Following generally the procedure of Example I, the charge of 50 g. mesitylene, 50 g. sulfolane, 0.5 ml. cumene hydroperoxide and 2 g. magnesium oxide was oxidized at a temperature of 135° C. during 7.5 hours. A control was run using the same reactants and procedure, except that no sulfolane was added to the reaction mass. The results using sulfolane were: 3.75 time increase in maximum weight percent per hour of hydroperoxide formation over the control; 1.8 time increase in average weight percent per hour of hydroperoxide formation; and 1.9 times increase in the final weight percent of hydroperoxide formation.

EXAMPLE X

The use of N,N-dimethylacetamide as a solvent in the oxidation of 5-isopropyl-m-xylene (3,5-dimethylcumene) also resulted in improved autoxidation rates. In the solvent experiment, carried out generally according to Example I (Experiment A) a charge of 50 g. 5-isopropyl-m-xylene (98% purity) 0.5 ml. cumene hydroperoxide, 2.0 g. magnesium oxide and 50 g. N,N-dimethylacetamide was oxidized at 100–115° C. during 10.25 hours. In a nonsolvent experiment (Control) a charge of 100 ml. of 5-isopropyl-m-xylene, 1.0 ml. of cumene hydroperoxide and 3.0 g. of magnesium oxide was oxidized at 125° C. for 15 hours.

The results were:

| Experiment | Hydroperoxide formation | | Final wt. percent |
|---|---|---|---|
| | Weight percent/hour | | |
| | Maximum | Average | |
| A | 3.4 | 1.4 | 14.3 |
| Control | 1.7 | 1.0 | 10.8 |

There is again evidenced the superiority of the process of the present invention. The use of sulfolane as a solvent did not give greatly increased benefits because of immiscibility with 5-isopropyl-m-xylene preventing a homogeneous reaction mixture.

EXAMPLE XI

A series of experiments were run to show that the benefits of the present process are not merely the result of dilution of the charged hydrocarbon. In the experiments, listed in Table II, various solvents were tested for their effect on the oxidation rate and controls using no solvent were also tested. The procedure followed generally that of Example I, with the temperature of the reactions being 125° C. The various charges are listed in Table II, giving the amount of p-cymene and the type and amount of the initiator, base, and various solvents. The results of the various experiments are listed in Table II.

HYDROPEROXIDATION OF p-CYMENE

| Experiment | Charge | | | Solvent | Time, hrs. | Hydroperoxide formation, wt. percent/hour | | Final wt. percent |
|---|---|---|---|---|---|---|---|---|
| | p-Cymene | Cumene hydroperoxide (ml.) | Base (g.) | | | Maximum | Average | |
| A | 50 ml | 0.5 | Na₂CO₃(1.0) | Sulfolane (50 ml.) | 3.7 | 13.0 | 6.9 | 28 |
| B | 50 g | 0.5 | MgO(3.0) | N,N-dimethylacetamide (50 g.) | 4.0 | 11.4 | 6.4 | 26 |
| C | 100 ml | 1.0 | Na₂CO₃(2.0) | None | 9.0 | 3.7 | 2.7 | 25 |
| D | 100 ml | 1.0 | MgO(3.0) | do | 6.75 | 5.0 | 3.5 | 23 |
| E | 50 g | 0.5 | Na₂CO₃(1.0) | Dimethylsulfoxide (50 g.) | 3.75 | 1.0 | 0.2 | 2.0 |
| F | 50 ml | 0.5 | Na₂CO₃(1.0) | Diphenyl Ether (50 ml.) | 10.3 | 2.8 | 1.4 | 15 |
| G | 50 ml | 0.5 | Na₂CO₃(1.0) | Anisole (50 ml.) | 15.0 | 1.8 | 1.2 | 18 |
| H | 50 g | 0.5 | MgO(3.0) | Trichlorobenzene | 6.0 | 3.2 | 2.0 | 13 |
| I | 50 g | 0.5 | MgO(3.0) | o-Dichlorobenzene (50 g.) | 5.0 | 2.4 | 1.7 | 9 |

EXAMPLE XII

Two experiments were carried out according to Example I, in which diethylbenzene was oxidized in the presence of and absence of sulfolane. The solvent reaction (A) had a chrage of 50 g. of diethylbenzene, 50 g. sulfolane, 0.5 ml. cumene hydroperoxide and 2.0 g. of magnesium oxide. The nonsolvent reaction (Control) had a charge of 100 ml. diethylbenzene, 1.0 ml. cumene hydroperoxide and 2.0 g. of magnesium oxide. The reaction was carried out at 110–120° C.

The results were:

| Experiment | Hydroperoxide formation | | Final wt. percent |
|---|---|---|---|
| | Wt. percent/hour | | |
| | Maximum | Average | |
| Control | 3.1 | 2.7 | 20.6 |
| A | 4.8 | 3.6 | 36.0 |

EXAMPLE XIII

Oxidations according to the present process using sulfolane as solvent to give increased rates of hydroperoxide formation were also carried out using durene, o-xylene, p-xylene and ethylbenzene as starting hydrocarbons.

What is claimed is:
1. In a process for the hydroperoxidation of aromatic hydrocarbons of the formula:

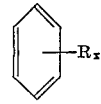

wherein R is selected from the group consisting of alkyl having 1 to 6 carbon atoms and cyclohexyl, and $x$ is an integer from 1 to 4, by treatment of said hydrocarbon with oxygen at a temperature of 75 to 150° C. and in the liquid phase, the improvement comprising treating said hydrocarbon with said oxygen in the presence of 25 to 150% by weight based on the amount of said hydrocarbon of an organic solvent for said hydrocarbon, selected from the group consisting of sulfolane, N,N-dimethylacetamide and N,N-diethylacetamide.

2. The process of claim 1 wherein said hydrocarbon is a trimethylbenzene.

3. The process of claim 1 wherein said hydrocarbon is cumene.

4. The process of claim 1 wherein X is 2.

5. The process of claim 1 wherein X is 3.

6. The process of claim 1 wherein X is 4.

7. Process for producing a hydroperoxide of an aromatic hyrocarbon of the formula:

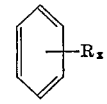

wherein R is selected from the group consisting of alkyl having 1 to 6 carbon atoms and cyclohexyl, and $x$ is an integer from 1 to 4 comprising contacting said hydrocarbon in liquid phase with oxygen at a temperature of 75 to 150° C. in the presence of 25 to 150% by weight based on the amount of said hydrocarbon of an organic solvent, for said hydrocarbon, selected from the group consisting of sulfolane, N,N-dimethylacetamide and N,N-diethylacetamide to produce a product mixture containing said hydroperoxide, adding water to said product mixture to separate said mixture into two phases, separating said phases and recovering hydroperoxide therefrom.

References Cited

FOREIGN PATENTS 719,895  12/1954  Great Britain.

OTHER REFERENCES

Milas et al.: "JACS," vol. 81, pp. 3361–64 (1959).

BERNARD HELFIN, Primary Examiner

W. B. LONE, Assistant Examiner